United States Patent [19]
Treutler et al.

[11] Patent Number: 5,718,384
[45] Date of Patent: Feb. 17, 1998

[54] INJECTION NOZZLE

[75] Inventors: Christoph Treutler, Wannweil; Hans-Friedemann Kober, Tuebingen, both of Germany

[73] Assignee: Robert Bosch GmbH, Stuttgart, Germany

[21] Appl. No.: 546,238

[22] Filed: Oct. 20, 1995

[30] Foreign Application Priority Data

Oct. 22, 1994 [DE] Germany .................. 44 37 847.5

[51] Int. Cl.⁶ ............................................. B05B 1/32
[52] U.S. Cl. ............................. 239/457; 239/552
[58] Field of Search ...................... 239/533.2, 548, 239/552, 553, 553.5, 568, 584

[56] References Cited

U.S. PATENT DOCUMENTS

| | | | |
|---|---|---|---|
| 469,211 | 2/1892 | Kline | 239/568 X |
| 2,051,108 | 8/1936 | Sattler | 239/552 X |
| 3,640,472 | 2/1972 | Hruby, Jr. et al. | 239/552 |
| 4,069,978 | 1/1978 | El Moussa | 239/533.2 |
| 4,204,631 | 5/1980 | Hruby, Jr. | 239/552 |
| 4,339,081 | 7/1982 | Lindqvist | 239/552 |

FOREIGN PATENT DOCUMENTS

| | | |
|---|---|---|
| 1047300 | 12/1953 | France . |
| 506609 | 6/1939 | United Kingdom . |
| 735519 | 8/1955 | United Kingdom . |

*Primary Examiner*—Andres Kashnikow
*Assistant Examiner*—Steven J. Ganey
*Attorney, Agent, or Firm*—Edwin E. Greigg; Ronald E. Greigg

[57] ABSTRACT

The invention relates to an injection nozzle for a diesel injection system in motor vehicles, having at least one spray passage penetrating an injection nozzle and to a process for manufacturing the injection nozzle. The invention provides for the injection nozzle to be formed from two parts which engage with one another as a form-fit and are in contact on generated surfaces and for the spray passages to be configured as open-edged depressions on at least one of the generated surfaces.

13 Claims, 8 Drawing Sheets

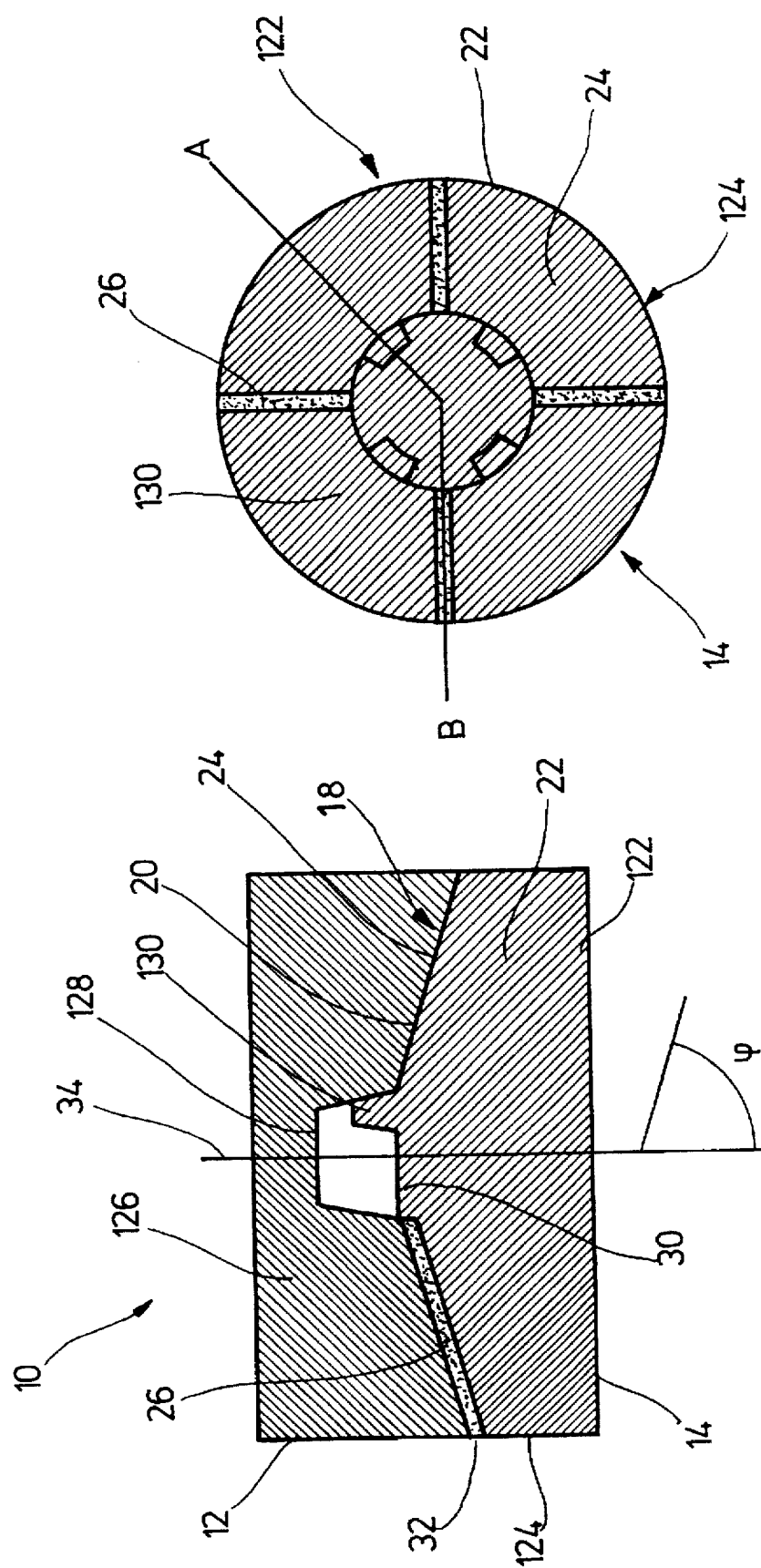

INJECTION NOZZLE

The invention relates to an injection nozzle for, a diesel injection system in motor vehicles, and to a process for manufacturing an injection nozzle.

PRIOR ART

In internal combustion engines for motor vehicles, it is known art to employ injection valves by means of which the fuel is sprayed into the cylinder chambers of the internal combustion engines. For this purpose, the injection nozzle is penetrated by at least one spray passage which opens into the cylinder chamber. The preparation of an air/fuel mixture in the cylinder chambers can be influenced by means of a number, a cross section and a jet direction of the spray passages. For this purpose, it is known art to attempt to achieve spray passages employing continually smaller cross sections at continually higher pressures in order to optimize the internal combustion engines, in particular with respect to consumption, pollutant emission, power and noise generation. For a specified geometry of the cylinder chambers (combustion chambers of the internal combustion engines), it is known art to arrange the spray passages at an angle to a longitudinal axis of the injection nozzle.

For this purpose, injection nozzles are known which have a nozzle plate which consists of one part and into which spray passages are introduced by, for example, erosion, precision mechanical drilling or laser drilling. A disadvantageous feature in this respect is that the spray passages cannot be manufactured with the necessary accuracy in the extremely small dimensional range and that it is only possible to introduce spray passages with the same angular location in an injection nozzle.

ADVANTAGES OF THE INVENTION

The injection nozzle according to the invention has, in contrast, the advantage that a multiplicity of spray passages can, in a simple manner, be provided which can be simply manufactured with high accuracy and which have the same angle relative to a longitudinal axis of the injection nozzle but have a different inclination relative to a plane extending through the injection nozzle. Because the injection nozzle is formed from two parts which engage with one another as a form-fit and which are in contact on generated surfaces and because the spray passages are configured as open-edged depressions on at least one of the generated surfaces, the spray passages can have an arbitrary inclination corresponding to the selection of the generated surfaces so that the spray direction of the spray passages can be freely determined. In accordance with a preferred configuration of the invention, the generated surfaces extend in the shape of a truncated cone so that the spray passages are arranged in conical shape and a conically widening injection of the fuel into the combustion chamber is thus possible. By this means, a distribution of the fuel over a relatively large volume is achieved so that an improved preparation of an air/fuel mixture is possible.

Furthermore, it is advantageous for the spray passages to have a cross section which changes along their length so that the injection behavior of the injection nozzle can be adjusted by the selection of the cross section of the spray passages. Cross sectional expansions and/or cross sectional contractions and/or cross sectional branches are thus advantageously possible which exert a nozzle effect and/or a diffuser effect on the fuel forced through the spray passages. The distribution of the fuel used to form the air/fuel mixture in the cylinder chambers can, therefore, be optimized and adjusted very accurately.

A further advantageous configuration of the invention provides for the cross section of the spray passages to be variable. For this purpose, a generated surface of one part advantageously possesses elevations which are complementary to the depressions of the other generated surface of the other part and engage in the depressions, the parts being advantageously arranged so that they can be moved vertically relative to one another. The elevations of one generated surface can be displaced in the depressions of the other generated surface in such a way that a valve-type change in the cross sectional area of the spray passages occurs. In the case of a motion of the two parts directed towards one another, the elevations are introduced into the depressions and thus reduce the cross section of the spray passages and, in the maximum case, they can completely close this cross section. This minimizes a dead volume of the injection nozzle. In order to prevent jamming of the parts, which are supported so that they can move relative to one another, the depressions or the elevations can experience a slight removal of material so that these depressions and elevations can be moved relative to one another with a minimum clearance.

The process according to the invention has the advantage that an injection nozzle with spray passages can be manufactured at favorable cost and with high accuracy. Because the injection nozzle is formed from two parts which engage with one another as a form-fit and which are in contact on the generated surfaces, these parts being manufactured by coining or by injection into a mold made from a plastic, with subsequent electrolytic replication, and because the two parts are subsequently joined together, a highly accurate injection nozzle can be manufactured by means of a simple production process. In particular, high-accuracy injection nozzles can be achieved by means of the micro-mechanical process steps and, despite mass production, these do not permit any sacrifices in quality to occur. A combination of the micro-mechanical structuring process of the surfacing technique and the electrochemical replication technique—in association with the two-part construction of the injection nozzle—permits the manufacture of injection nozzles with arbitrarily inclined, microscopically fine spray passages, which permit favorable costs in mass production while simultaneously maintaining minimum error tolerances. In particular, the micro-mechanical processes and the replica techniques permit arbitrary variations of the spray passages with respect to their angle of inclination, their cross section and their change in cross section.

Further advantageous configurations of the invention are provided by the other features set forth hereinafter.

BRIEF DESCRIPTION OF THE DRAWINGS

The invention is explained in more detail below in different embodiment examples by means of the associated drawings. In these:

FIGS. 23 to 26 show process steps for manufacturing the second part of the injection nozzle in accordance with a further variant and FIGS. 27 and 28 show, diagrammatically, a sectional representation and a plan view of an injection nozzle in accordance with a further variant.

DETAILED DESCRIPTION

Figure 1:
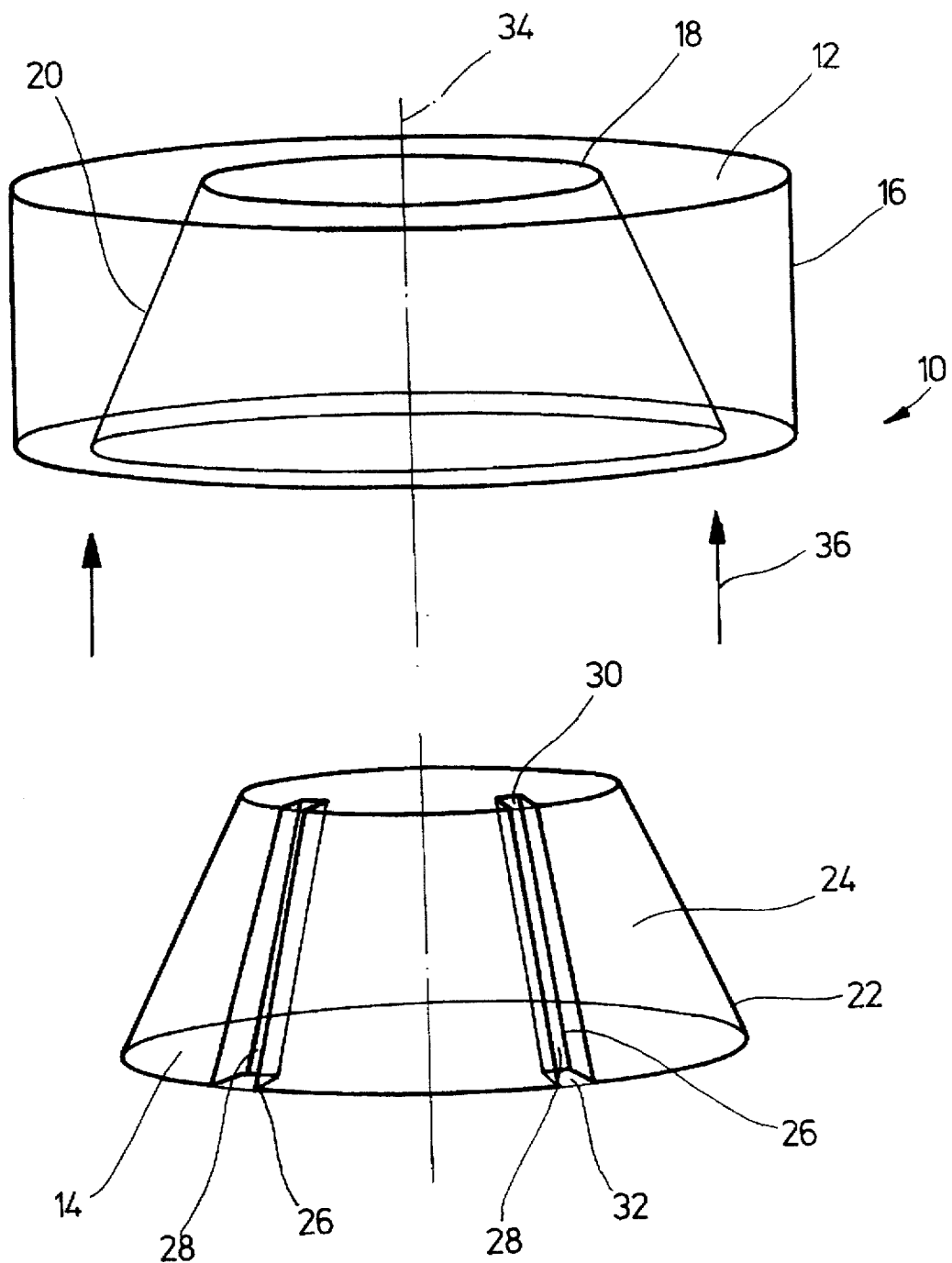
FIG. 1 shows, diagrammatically, a perspective view of an injection nozzle.

FIG. 1 shows an injection nozzle, which is generally designated by 10. The injection nozzle 10 consists of a first part 12 and a second part 14. The first part 12 has a basic body 16 which is preferably of rotationally symmetrical configuration and has an axial through opening 18. The through opening 18 extends in the shape of a truncated cone and is bounded by a generated surface 20. The part 14 is formed by a truncated cone 22 which has a generated surface 24. The shape of the truncated cone 22 corresponds to the shape of the truncated cone of the through opening 18, i.e. the generated surfaces 20 and the generated surfaces 24 extend at the same conical angle. Spray passages 26 are arranged around the periphery of the truncated cone 22 on the generated surface 24. Two spray passages 26 are shown in FIG. 1, it being possible to provide an arbitrary number of spray passages 26 around the periphery of the truncated cone 22. The spray passages 26 are configured as depressions 28 open-edged relative to the generated surface 24. The spray passages 26 have an inlet cross section 30 and an outlet cross section 32. In the example shown, both the inlet cross section 30 and the outlet cross section 32 have a rectangular configuration. These can also, however, have any other given geometrical shape. The spray passages 26 have an angular location, corresponding to the generated surface 24, relative to a hypothetical axial line 34 and have a different inclination relative to a plane laid through the axial line 34, corresponding to how they are positioned on the generated surface 24.

Corresponding to the arrows 36, the part 14 is joined into the part 12, the generated surface 24 of the part 14 being in contact as a form-fit with the generated surface 20 of the part 12. Depending on the opening angle of the truncated cone 22 and of the truncated cone-shaped through opening 18, the joining of the parts 12 and 14 can take place by pressing, diffusion welding, brazing, isothermal solidification or other suitable joining processes. Because the configuration of the truncated cone 22 is complementary to that of the through opening 18, self-adjustment takes place during the joining process so that, overall, the injection nozzle 10 is produced. During the joining process, the generated surface 20 closes the open-edged depressions 28 of the part 14 along the generated surface 24 so that the spray passages 26, together with their inlet cross sections 30 and their outlet cross sections 32, are produced. After the joining process, the injection nozzle 10 can be surface-ground and, if required, it can be polished on its lower and/or upper surface so that the inlet cross sections 30 and the outlet cross sections 32 are reliably laid bare. The injection nozzle 10, together with its basic body 16, can now be assembled into a corresponding accommodation feature of an injection system, for example into an injection nozzle holder.

Figure 2:
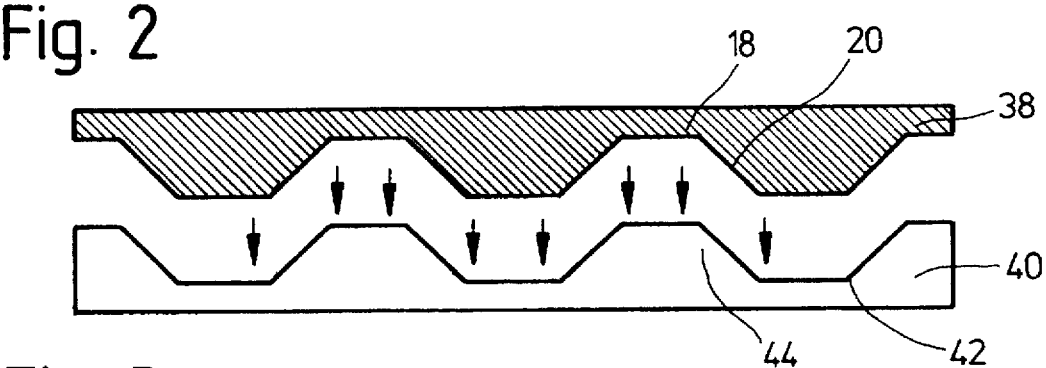
FIGS. 2 to 4 show process steps for manufacturing a first part of the injection nozzle.
Figure 3:
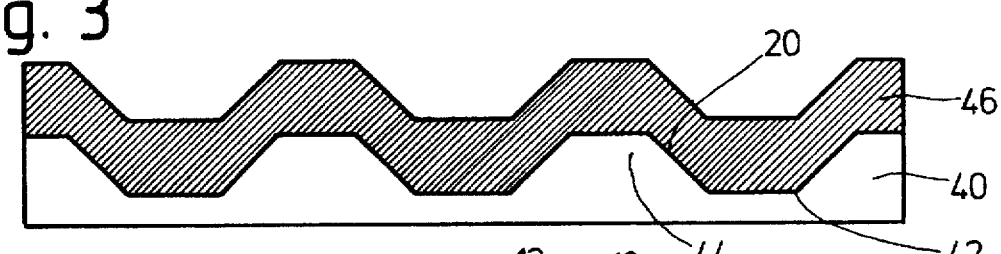
Figure 4:
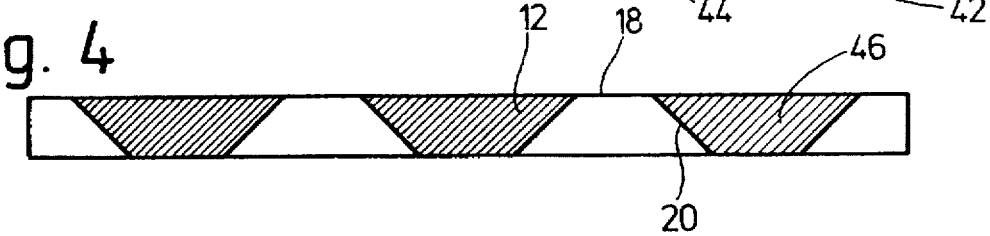

The manufacturing process of the part 12 shown in FIG. 1 is illustrated by means of FIGS. 2 to 4. In this and the subsequent figures, the process steps shown always involve so-called multiple use, i.e. a multiplicity of parts is always processed simultaneously in one process step.

In a first process step, a coining die 38, which has the topography of the later part 12, is pressed into a plastically deformable mass of plastic 40. Polymethylmethacrylate (PMMA) is, for example, used as the mass of plastic 40. A negative mold 42 of the coining die 38 is generated in the mass of plastic 40 when the coining die 38 is pressed into the mass of plastic 40, an operation which can be carried out, for example, into a thermoplastically deformable mass of plastic under the action of heat. The coining die 38 has in this case the machined-out through openings 18 with their generated surfaces 20. After the coining procedure, the negative mold 42 has truncated cone-shaped elevations 44 whose shape corresponds to the later through opening 18. Instead of the negative mold 42 being manufactured by coining, it can also be manufactured, as an alternative, by micro-injection molding, reaction injection molding or some other suitable manufacturing process.

The mass of plastic 40 providing the negative mold 42 is electrically conducting. This is achieved by, for example, adding a conducting filler, for example metal or carbon, to the mass of plastic 40 or by metallizing the negative mold 42 on its surface. The application of a thin-layer metallization can, for example, take place by sputtering or vacuum deposition. This metallizing, or the electrically conducting mass of plastic 40, is used as the plating base for a subsequent electrochemical precipitation process.

FIG. 3 illustrates a next process step in which an electrolytically deposited layer 46 is electrochemically precipitated on the negative mold 42. The layer 47 adapts itself to the contour of the negative mold 42. In particular, the layer 46 forms the generated surface 20, of the later penetrations 18, as specified by the elevations 44 of the negative mold 42. All the substances which are amenable to electrochemical processes can be used as the material for the layer 46. A chemically alloyed nickel (for example NiP, NiB, NiCo) is particularly suitable because of its mechanical properties with, at the same time, good machinability. Corresponding to the selection of the coining die 38, the angle of the generated surfaces 20 of the truncated cone-shaped elevations 44 can be freely selected in the range between 0° and 90°.

In a next process step, the layer 46 is faced, i.e. the regions of the layer 46 protruding beyond the elevations 44 are removed by appropriate machining, for example milling, grinding or face-turning. The mass of plastic 40 is subsequently extracted so that the structure shown in FIG. 4 is obtained from the layer 46 with plane-parallel surfaces which have a number of through openings 18 corresponding to the selected pattern of the coining die 38. These through openings 18 have a truncated-cone shape and are bounded by the generated surfaces 20. This provides an integral structure with many parts 12, whose separation into individual parts is still to be explained.

Figure 5:
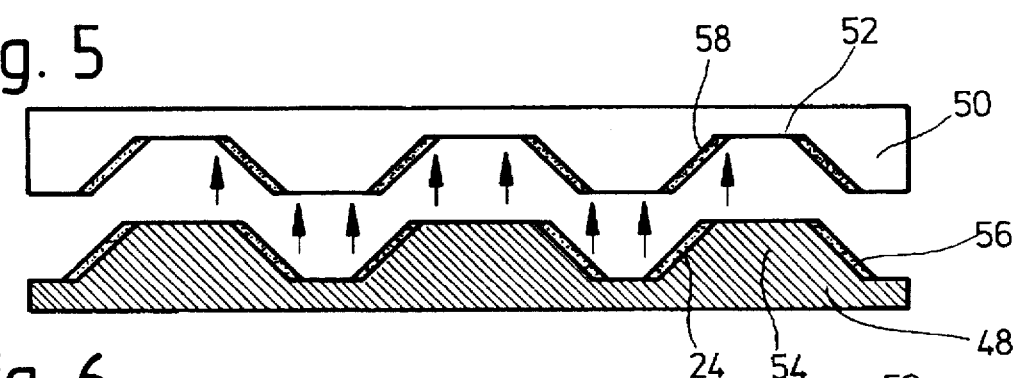
FIGS. 5 to 7 show process steps for manufacturing a second part of the injection nozzle.
Figure 6:
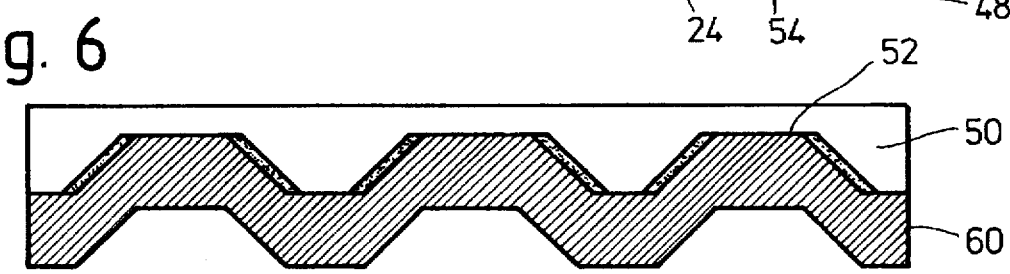
Figure 7:
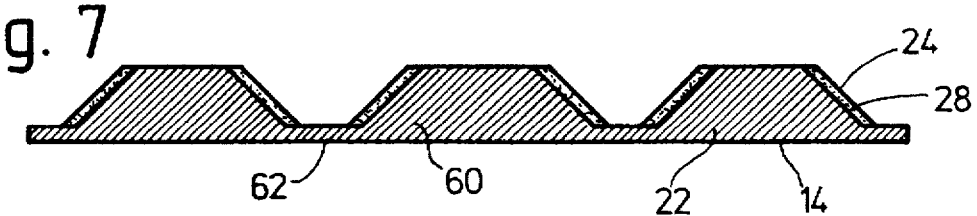

The manufacture of the part 14 shown in FIG. 1 is illustrated in FIGS. 5 to 7. The manufacture of the parts 14 takes place in a manner analogous to the manufacture of the parts 12. A coining die 48 is pressed into a plastically deformable mass of plastic 50 and a negative mold 52 is generated in the mass of plastic 50. The coining die 48 has a multiplicity of elevations 54 corresponding to the shape of the later truncated cone 22. The elevations 54 have a generated surface which corresponds to the later generated surface 24. Depressions 56 are machined into the elevations 54 corresponding to the desired number of later spray passages 26. When replicated in the mass of plastic 50, the depressions 56 lead to elevations 58 in the mass of plastic 50, these elevations 58 being a constituent part of the negative mold 52. The mass of plastic 50 is again electrically conducting or is provided with appropriate metallization. In a next process step, a layer 60 is electrochemically deposited over the negative mold 52. The layer 60 adapts itself to the contour of the negative mold 52 and forms, after facing and extraction, the mutually connected parts 14 shown in FIG. 7. The parts 14 exhibit the truncated cones 22 with their generated surfaces 24 and the depressions 28 extending along the generated surfaces 24. A multiplicity of parts 14 are connected together like a mat, corresponding to the pattern selected for the coining die 48, by means of residual webs 62 of the layer 60.

The parts 12 and 14, which are manufactured by the multiple use procedure, are now joined together by the structure shown in FIG. 4 being placed onto the structure shown in FIG. 7. The through openings 18 are then closed by the truncated cones 22, the depressions 28 initially forming blind holes. After the joining which—as has already been mentioned with respect to FIG. 1—can take place by means of pressing, welding, soldering, etc., the webs 62 are removed by face-turning, for example, so that the depressions 28 finally provide the through spray passages 26. The joined parts 12 and 14 are subsequently separated into individual components by, for example, sawing, punching, laser cutting or the like.

Figure 8:
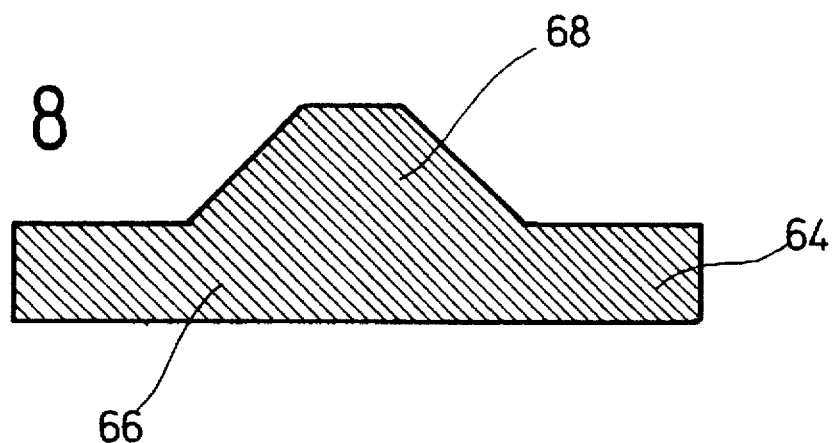
FIGS. 8 to 10 show process steps for manufacturing a coining die for manufacturing the first part of the injection nozzle.
Figure 9:
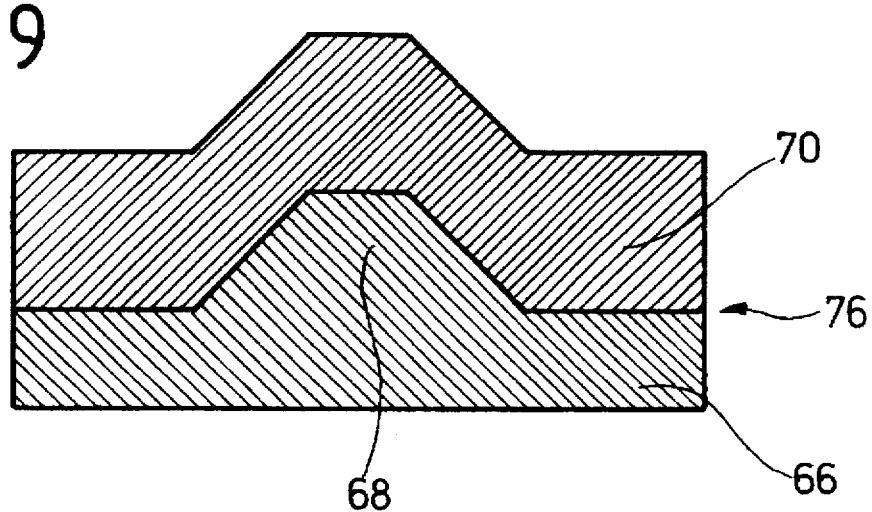
Figure 10:
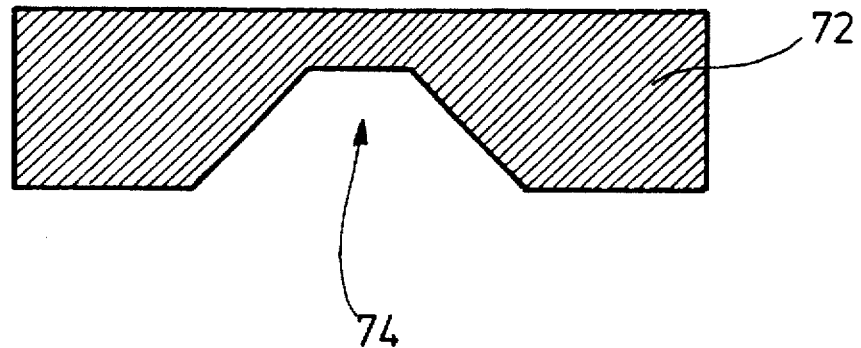
Figure 11:
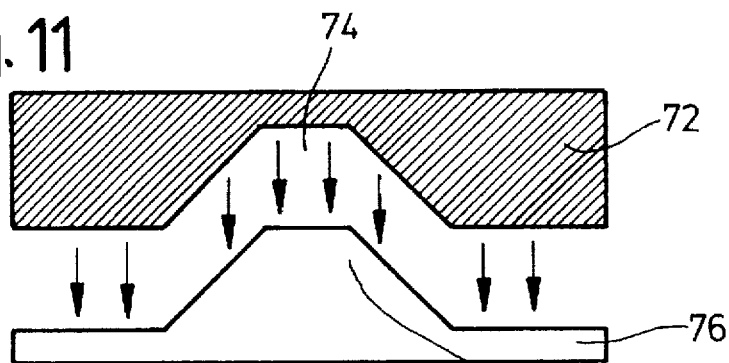
FIGS. 11 to 16 show process steps for manufacturing a coining die for manufacturing the second part of the injection nozzle.

The manufacture of the coining die 38 is illustrated in FIGS. 8 to 10. In a first process step, a truncated cone 68 is manufactured from a material 64 by precision mechanical microprocessing of a base plate 66. A plastic or a metal can, for example, be used as the material 64. The truncated cone 68 is generated, for example, by micro-turning using precision diamonds. The truncated cone 68 can subsequently be freed of irregularities and residual roughness on its conical surface by a grinding operation. These micro-mechanical process steps are controlled with a very high level of accuracy so that high-level accuracy can be achieved in the later parts 12 and 14, and in the injection nozzle 10. The base plate 66 with the truncated cone 68 is covered by an electrolytically deposited layer 70. The layer 70 has a thickness which goes beyond the truncated cone 68. The layer 70 is subsequently surface-ground and the base plate 66 with the truncated cone 68 is extracted. This produces the element 72 which is shown in FIG. 10 and which has a depression 74 corresponding to the later through opening 18 of the part 12. Simultaneous manufacture of a multiplicity of elements 72 produces the coining die 38 which is shown in FIG. 2 and which, in multiple use, can simultaneously coin a correspondingly large number of parts 12—as explained. A plastic, which can be extracted either mechanically or chemically, can—for example—be used as the material 64. The material 64 can, for example, be thermoplastic so that it can be released by a simple application of heat. In addition, the plastic can be dissolved by a solvent. The material 64 can likewise consist of a metal which preferably has the same coefficient of thermal expansion as the material used for electrolytically depositing the layer 70. By this means, a very high-level transfer of the structures of the truncated cone 68 onto the layer 70 and finally, therefore, onto the element 72, can take place. In order to achieve a defined adhesion of the layer 70 on the material 64, a thin intermediate layer with a thickness of approximately 100 nanometers can be applied to the material 64, for example by sputtering or vacuum deposition. The position of the intermediate layer is indicated by 76 in FIG. 9.

The coining die 38 manufactured from the elements 72, in accordance with FIGS. 8 to 10, is not only used for coining the parts 12 but also for the manufacture of the coining dies 48 for coining the parts 14. The solution thus found permits very high-level fitting accuracy between the parts 12 and 14 when they are joined together to form the injection nozzle 10.

Figure 12:
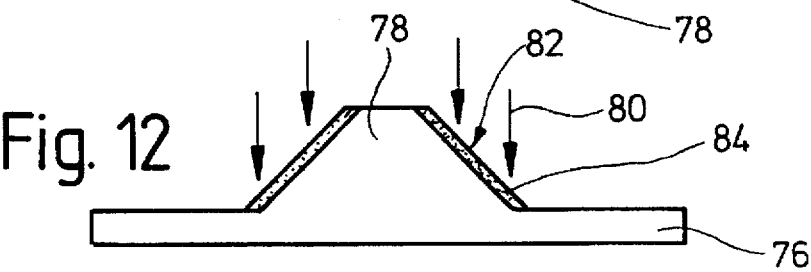
Figure 13:
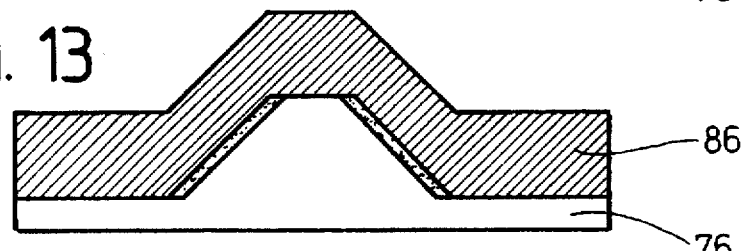

The manufacture of the coining dies 48 is illustrated in FIGS. 11 to 16. In a first process step, the shape of the element 72 is transferred onto a solid plate 76 made from a plastic. By this means, the plate 76 made from a plastic is given a truncated cone-shaped elevation 78 corresponding to the depression 74. The depressions providing the later spray passages 26 are now structured in the elevation 78. This structuring takes place, for example, by means of an excimer laser which effects a corresponding removal of material. The action of the excimer laser is indicated in FIG. 12 by the arrows 80. By means of the excimer laser, incisions 84 occur on the conical generated surface 82 of the elevation 78. The possibilities for structuring the incisions 84 are explained in more detail using FIGS. 17 and 18.

Figure 14:
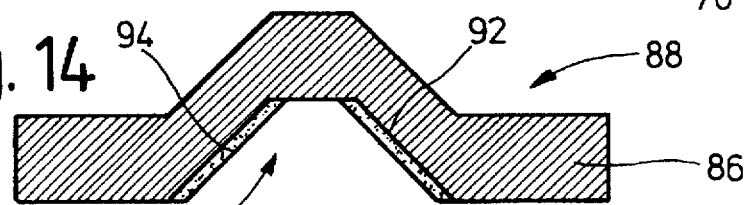
Figure 15:
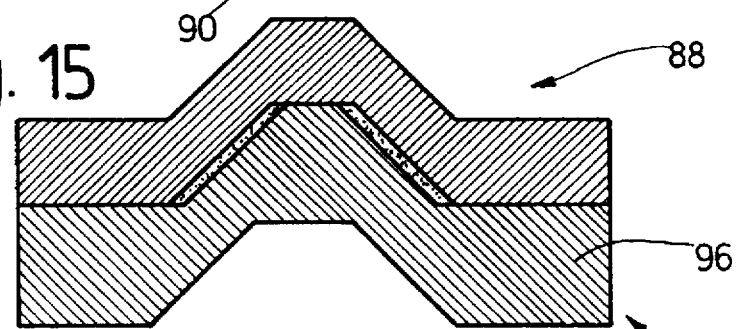
Figure 16:
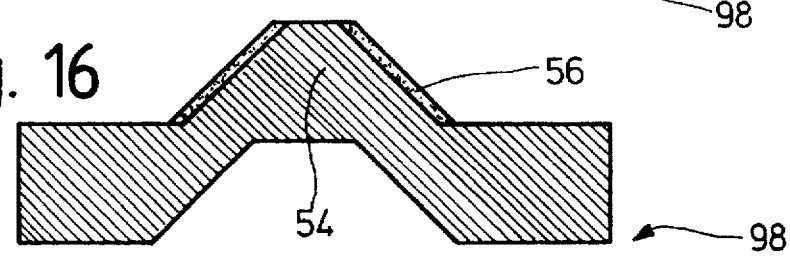

The plate 76 consists of a plastic which is electrically conducting because it has, for example, metal particles or carbon as a filler. On the other hand, the finished structure shown in FIG. 12 can be provided with thin metallization as a plating base for subsequent electrochemical deposition. A first layer 86 is now electrolytically deposited onto the structured plate 76 made from a plastic and this first layer adapts itself to the contour of the plate 76, in particular to the elevation 78 and the incisions 84. The plate 76 made from a plastic is subsequently extracted mechanically, chemically or by thermal treatment so that the element 88 shown in FIG. 14 is produced. This element has a depression 90 which has a truncated cone-shaped shape, the elevations 94 corresponding to the incisions 84 being present on the inner periphery of a generated surface 92. The element 88 obtained in this manner can now be covered by a thin intermediate layer—as already mentioned with respect to FIGS. 9 and 10. Electrolytic replication of the element 88 subsequently takes place by means of a second layer 96 which now has a shape which is complementary to the element 88. The layer 96 provides an independent element 98 on which the element 88 is arranged. In a next process step, the element 88 is removed. This can, for example, take place by mechanical means, particularly where the layers 86 and 96, or the elements 88 and 98, have been electrochemically deposited using the same metal. In accordance with a further possibility, the layers 86 and 96 can, however, consist of different metals, for example copper and nickel, so that the element 88 can be selectively etched away in order to extract the element 98. After the extraction of the element 88 from the element 98, the element 98 shown in FIG. 16 is obtained and this corresponds to the coining die 48 shown in FIG. 5. An appropriate coining die 48 with a multiplicity of elevations 54 can be manufactured by simultaneously manufacturing a multiplicity of elements 98. The elevations 54 exhibit the depressions 56—which provide the subsequent spray passages 26—by respectively replicating the elevations 94 of the elements 88.

Figure 17:
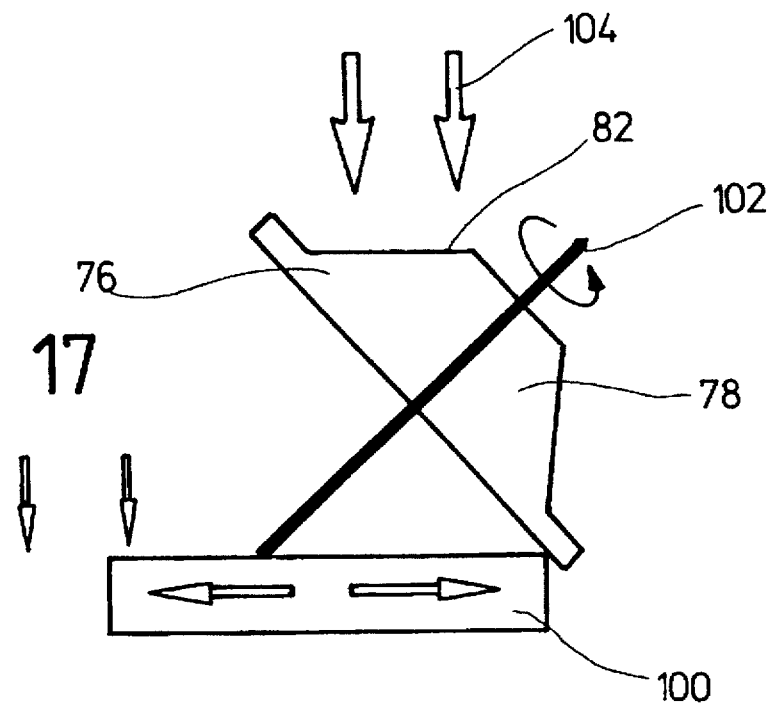
FIGS. 17 to 18 show process steps for manufacturing spray passages.

A first possibility for introducing the incisions 84 into the plate 76 in accordance with FIG. 12 is shown in FIG. 17. The plate 76 made from a plastic with the truncated cone-shaped elevation 78 formed onto it by the element 72 is clamped onto an assembly table 100 which can be moved in the x-y direction. The plate 76 is then fastened onto a rotatably supported, inclined spindle which is here diagrammatically indicated by 102. The spindle 102 has an inclination which is directed in such a way that the surface 82 of the truncated cone-shaped elevation 78 always has its upper region located parallel to the assembly table 100 during rotation of the plate 76 and located at right angles to laser radiation 104 of the excimer laser, which latter is not represented. By this means, the incisions 84—which later produce the spray passages 26—can always be introduced, by means of the laser radiation 104, in the region of the surface 82 which is currently located at the top. An arbitrary number of incisions 84 can be structured around the periphery of the truncated cone-shaped elevation 78 by rotation of the plate 76 about the axis of rotation 102. By means of the arrangement shown in FIG. 17, it is possible to generate substantially radially extending incisions 84.

Figure 18:
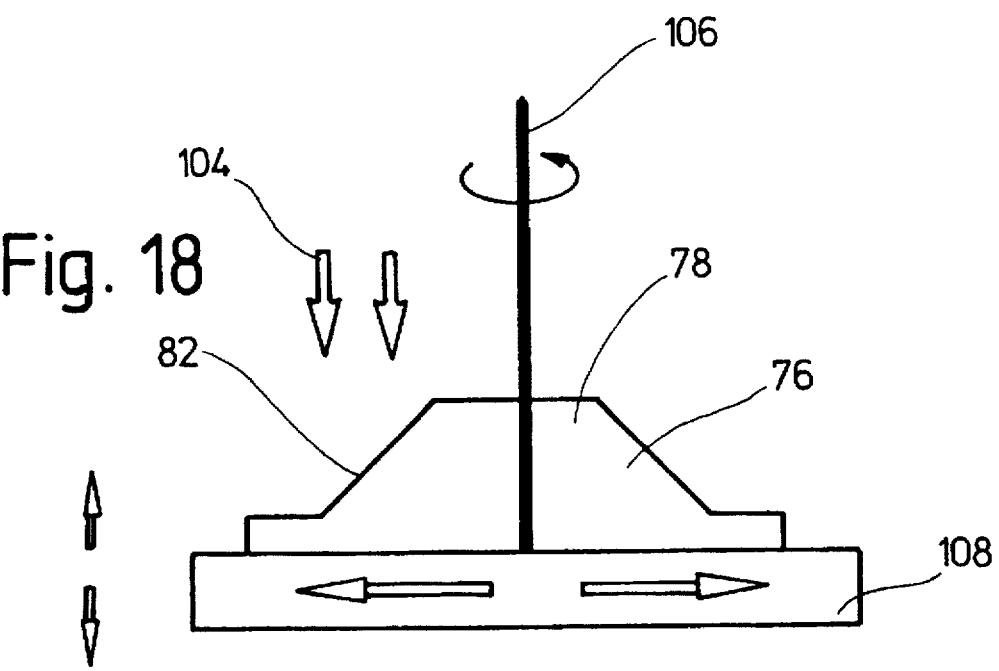

A further arrangement for generating the incisions 84 is shown in FIG. 18. The plate 76, which is made of a plastic, is here supported, so that it can be rotated about a vertical axis of rotation 106, on an assembly table 108 which can be displaced in the x-y-z direction. The plate 76 can again be machined by means of the laser radiation 104 of the excimer laser. Because of the possibility of moving the assembly table 108 in the x-y-z direction, the truncated cone-shaped elevation 78 can be arbitrarily positioned relative to the laser radiation 104. Arbitrarily extending incisions 84 can therefore be structured on the surface 82 in accordance with the selected laser radiation 104 and the position of the plate 76.

The structuring of the incisions 84 by means of the excimer laser is only an example. Instead of an excimer laser, any other given means for the micro-structuring of the incisions 84 can be employed, corresponding to the requirements with respect to the accuracy of the incisions 84—and therefore finally of the spray passages 26. These means can, for example, be photo-lithography processes, deep X-ray lithography processes and further known processes.

Different shapes of spray passages 26 are shown by way of example in FIGS. 19 to 22 and it is clear that these correspond to the incisions 84 introduced by means of the laser radiation 104—as explained in FIGS. 17 and 18. For improved clarity, however, reference is already made in this case to spray passages 26 although these latter arise from the incisions 84 by means of the corresponding replication of the coining dies and of the masses of plastic.

Figure 19:
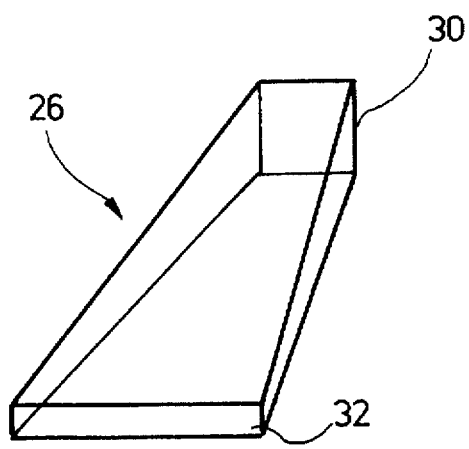
FIGS. 19 to 22 show embodiment variants of the spray passages.

FIG. 19 shows a spray passage which has an approximately square inlet cross section 30 which, in the course of the spray passage 26, merges into a rectangular outlet cross section 32. Relative to its length, the outlet cross section 32 has a relatively small height. The transition from the inlet cross section 30 to the outlet cross section 32 takes place substantially continuously.

Figure 20:
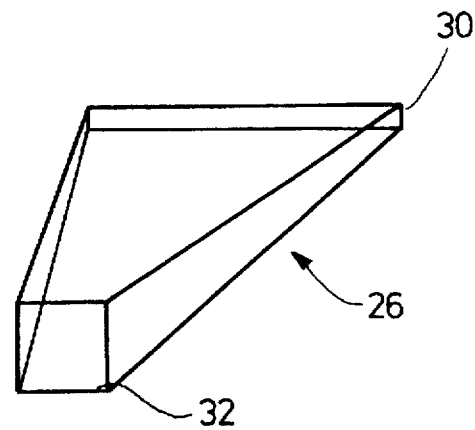

In accordance with FIG. 20, the spray passage 26 can also be built up in the opposite manner, a rectangular inlet cross section 30 with a height which is small relative to its length merging continuously into a substantially square outlet cross section 32.

Figure 21:
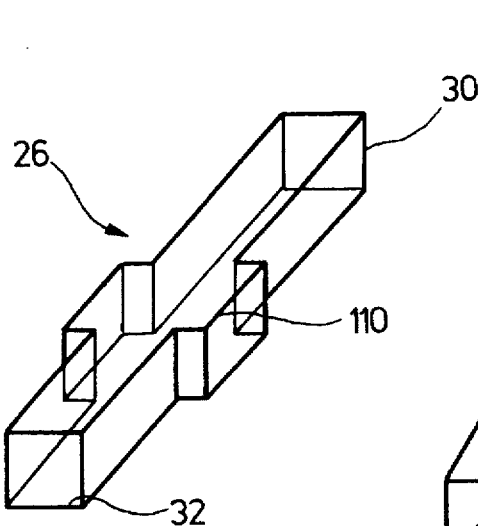

A further variant of a spray passage 26 is shown in FIG. 21. In this case, both the inlet cross section 30 and the outlet cross section 32 have substantially the same square shape. An expansion 110 is worked into the course of the spray passage 26.

Figure 22:
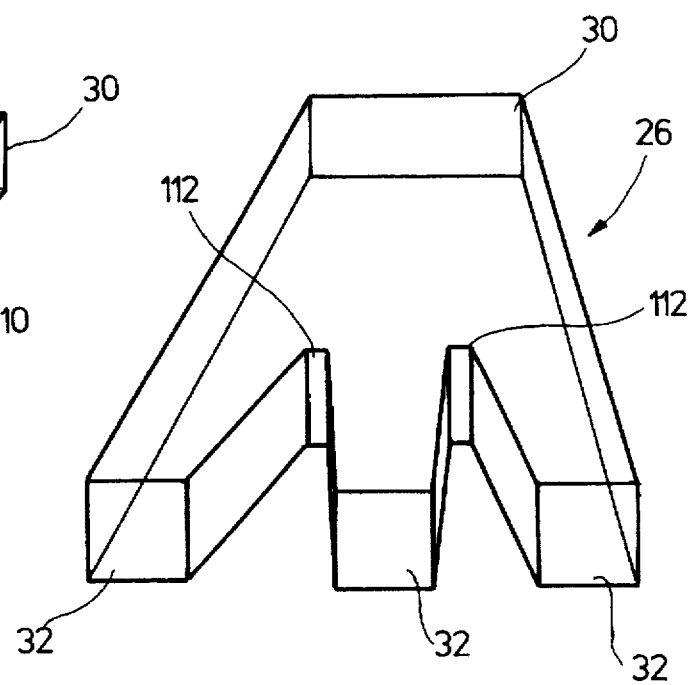
Figure 23:
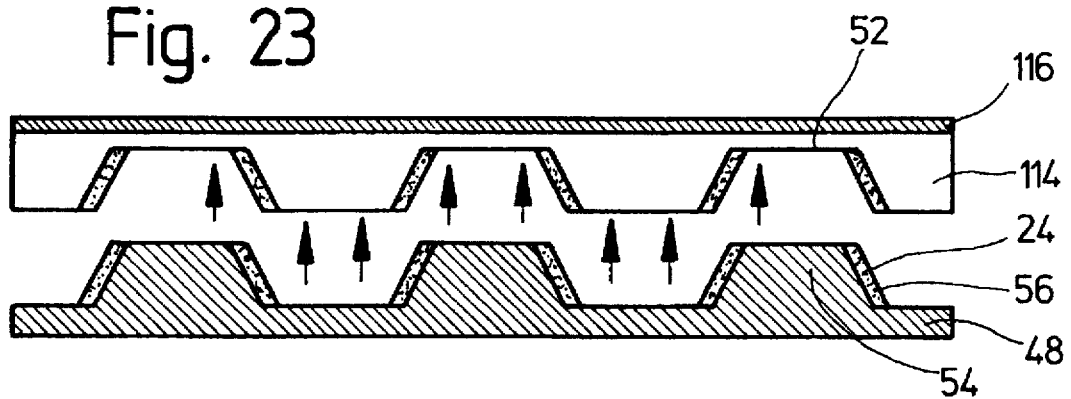
Figure 24:
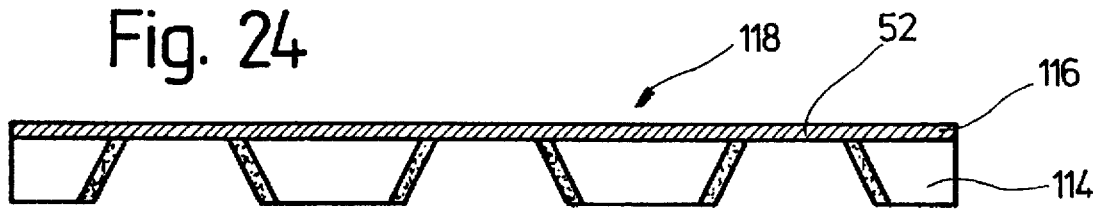
Figure 25:
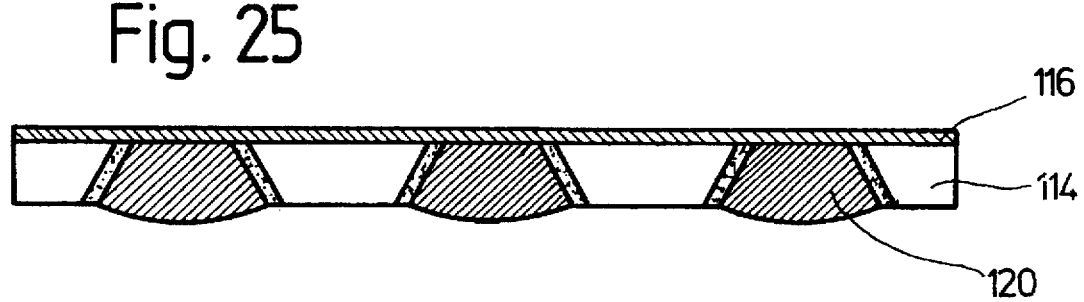

In accordance with FIG. 22, the spray passage 26 can branch from a rectangular inlet cross section 30 to a plurality of, for example, square outlet cross sections 32. For this purpose, branches 112 are worked into the course of the spray passage 26.

The design variants of the spray passages 26 represented in FIGS. 19 to 22 are only examples and are intended to illustrate the variety of possibilities. In principle, therefore, it is possible to design the spray passage 26 so that it changes from any arbitrary inlet cross section 30 to any arbitrary outlet cross section 32. By selecting the size relationships between the inlet cross sections 30 and the outlet cross sections 32, the overall effect of the spray passages 36 can be adjusted to provide, for example, a nozzle effect or a diffuser effect, etc. The emergence of the fuel guided through the spray passages 26 and therefore the formation of an air/fuel mixture can be influenced in a specified manner by providing expansions 110, branches 112 or contractions (not shown) in the course of the spray passages 26. Resolutions in the range below 1 µm are possible by means of the highly accurate machining using an excimer laser so that spray passages 26 with very small cross sections can be generated in large numbers and with high accuracy over the periphery of the truncated cone 22 of the injection nozzle 10. In an injection nozzle 10, therefore, it is likewise possible to provide different shapes of spray passages 26 which alternate, for example, in order—by this means—to provide influence on a particularly favorable flow pattern of the fuel injected via the spray passages 26, this pattern being optimized to suit the mixing chamber whose geometry is matched to the air/fuel mixture.

Figure 26:
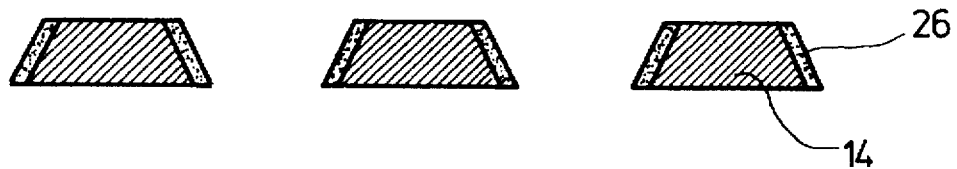

An alternative possibility for manufacturing the parts 14 of the injection nozzle 10 is illustrated in FIGS. 23 to 26. The coining die 48 is pressed into a metal plate 116 coated with a plastically deformable plastic 114. A non-metallic plate with a metallic coating provided on the mass of plastic 114 can also be used instead of the metal plate 116. After the coining procedure by means of the coining die 48, the metal plate 116 is laid bare in the region of the resulting negative mold 52 by the dry etching technique (RIE). This produces the structure 118, shown in FIG. 24, in which the negative molds 52 rise from the metal plate 116 in the mass of plastic 114. In a next process step, a filling is electrochemically deposited in these negative molds 52. The electrochemical deposition process takes place until such times as the filling 120 fills the negative molds 52 to above the plastic layer 114. In a next process step, regions of the filling 120 protruding beyond the mass of plastic 114 are surface-ground and the parts 14 with the spray passages 26, which are produced in this way and are shown in FIG. 26, are extracted. The process steps shown in FIGS. 23 to 26 offer the advantage that a comparatively small removal of material takes place when the filling 120 is surface-ground and less material therefore has to be used compared with the variant shown in FIGS. 5 to 7. This variant is particularly advantageous where an angle of inclination of the generated surfaces 24 of the parts 14 relative to the axial line 34 (FIG. 1) is relatively small and where the parts 12 and the parts 14 are to be joined to form the injection nozzle 10 after the parts 14 have been separated into individual parts.

FIGS. 27 and 28 show a specially configured injection nozzle 10 in which, despite a partly different construction, the same reference symbols as in FIG. 1 are used for the same parts for increased clarity. In these figures, the injection nozzle 10 is shown—with the parts 12 and 14 already joined together—in a sectional representation and a plan view of the part 14. FIG. 27 shows a sectional representation along the line A–B of FIG. 28; the part 12 not being represented in FIG. 28. The part 14 has the spray passages 26 which have a relatively large angle of inclination $\phi$ relative to the axial line 34. In the example shown, the angle of inclination $\phi$ is, for example, 75°. In the example, a total of four spray passages 26 are arranged over the generated surfaces 24 of the truncated cone 22. In addition to the truncated cone 22, the part 14 has a cylindrical section 122 which merges into the truncated cone 22. The spray passages 26 do not, therefore, emerge at the lower side of the part 14—and of the injection nozzle 10—but at its lateral periphery 124. The part 12 includes the through opening 18 only as a blind opening, which is open from the bottom and is closed by a region 126, of the part 12, located above it. The region 112 has a recess 128, which is open in the direction towards the part 14 and which acts as the supply opening for the medium, i.e. the fuel, to be sprayed by means of the injection nozzle 10. The construction selected for the parts 12 and 14 in the present case makes it possible to achieve very large angles of inclination φ of the spray passages 26. At the same time, it is desired to realize large layer thicknesses for the injection nozzles 10, which are approximately 1 mm for stability reasons, and a limited installation space available for the injection nozzle 10, with an external diameter of approximately 4 mm for example. By means of the variant shown, large lengths of the spray passages 26 can be achieved at the same time as small heights for the injection nozzle 10. The part 14 has additional adjustment aids 130 which, for example, protrude as spigot-shaped extensions beyond the truncated cone 22 and are in contact with the wall of the recess 128. For this purpose, the wall of the recess 128 and the adjustment aids 130 again have, respectively, a shape which extends conically so that self-adjustment occurs during assembly. The adjustment aids 130 are then respectively arranged between two adjacent spray passages 26 so that they do not hinder the supply of the fuel to the inlet cross sections 30 of the spray passages 26.

The foregoing relates to preferred exemplary embodiments of the invention, it being understood that other variants and embodiments thereof are possible within the spirit and scope of the invention, the latter being defined by the appended claims.

We claim:

1. An injection nozzle for a diesel injection system in motor vehicles, having at least one spray passage that penetrates the injection nozzle, wherein the injection nozzle (10) is formed from first and second parts (12, 14) which engage with one another as a form-fit and which are in contact on inner and outer generated surfaces (20, 24) and include spray passages (26) which are configured as open-edged depressions (28) on at least one of the generated surfaces (20, 24), and one generated surface (20, 24) has elevations complementary to the open-edged depressions (28) of another generated surface (20, 24).

2. The injection nozzle as claimed in claim 1, wherein the generated surfaces (20, 24) extend in the shape of a truncated cone.

3. The injection nozzle as claimed in claim 1, wherein an angle (φ) by which the spray passages (26) are inclined can be adjusted by means of the generated surfaces (20, 24).

4. The injection nozzle as claimed in claim 1, wherein the spray passages (26) have a variable geometry along their length.

5. The injection nozzle as claimed in claim 1, wherein the spray passages (26) have a variable cross section.

6. The injection nozzle as claimed in claim 1, wherein the spray passages (26) have a cross section which becomes continuously flatter and wider.

7. The injection nozzle as claimed in claim 1, wherein the spray passages (26) have a cross section which becomes continuously higher and narrower.

8. The injection nozzle as claimed in claim 1, wherein the spray passages (26) have expansions (110).

9. The injection nozzle as claimed in claim 1, wherein the spray passages (26) have branches (112).

10. The injection nozzle as claimed in claim 1, wherein an outlet cross section (32) of the spray passages (26) is larger than an inlet cross section (30).

11. The injection nozzle as claimed in claim 10, wherein the inlet cross section (30) is larger than the outlet cross section (32).

12. The injection nozzle as claimed in claim 1, wherein angle of inclination (φ) is between 0° and 90°.

13. The injection nozzle as claimed in claim 1, wherein the first and second parts (12, 14) are arranged so that they can move vertically relative to one another in such a way that the complementary elevations interact with the depressions (28) in a manner of a valve.

* * * * *